Figure 1:
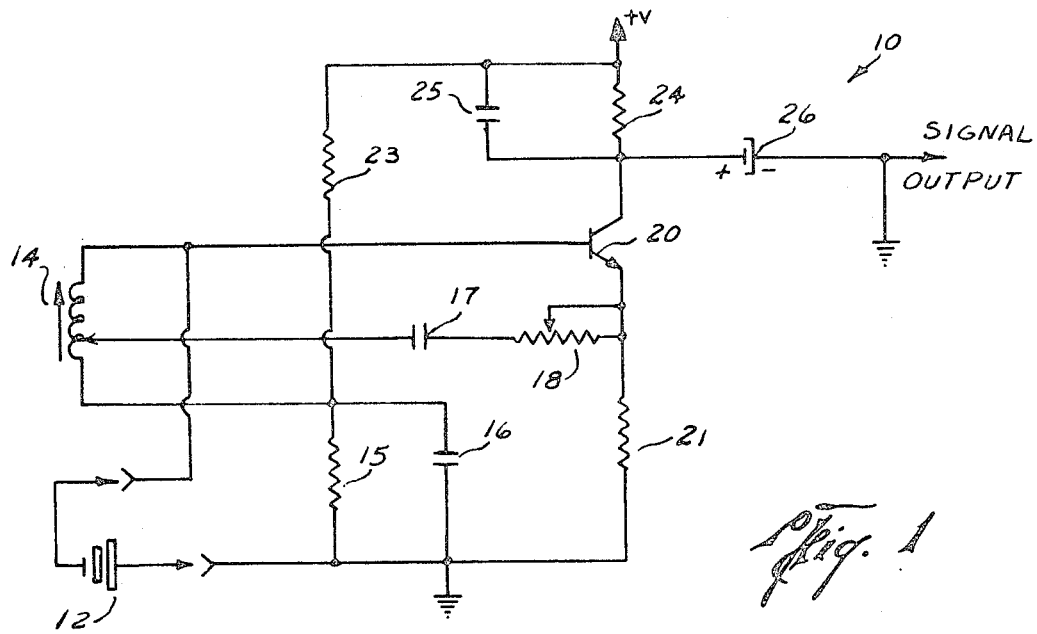

United States Patent

[11] 3,585,577

[72] Inventors William L. Rollwitz;
 Harvey S. Benson, both of San Antonio, Tex.
[21] Appl. No. 834,236
[22] Filed June 12, 1969
[45] Patented June 15, 1971
[73] Assignee Southwest Research Institute
 Continuation of application Ser. No. 672,091, Oct. 2, 1967, now abandoned.

[54] ULTRASONIC TRANSCEIVER
 5 Claims, 2 Drawing Figs.

[52] U.S. Cl. ..................................... 340/1, 340/3, 73/194
[51] Int. Cl. ..................................... G01s 9/66
[50] Field of Search .......................... 340/3, 3 D, 1; 73/194 A

[56] References Cited
UNITED STATES PATENTS

| | | | |
|---|---|---|---|
| 1,864,638 | 6/1932 | Chilowsky | 340/3 |
| 2,536,327 | 1/1951 | Tolson | 340/3 D |
| 2,935,728 | 5/1960 | Morgan | 340/3 |
| 3,123,798 | 3/1964 | Holloway | 340/3 |
| 3,231,852 | 1/1966 | Kritz | 340/3 |
| 3,321,959 | 5/1967 | Wood | 73/67.7 |
| 3,123,798 | 3/1964 | Holloway | 340/3 |
| 3,430,625 | 3/1969 | McLeod, Jr. | 73/194 X |

Primary Examiner—Richard A. Farley

ABSTRACT: Simplified ultrasonic transceiving apparatus preferably incorporating transducer means coupling ultrasonic vibrations into a medium, said means being bidirectional in operation to also convert vibrations from the medium into electrical signals; an oscillatory signal applied to said transducer means for propagation into the medium, and means forming an output signal combining the oscillatory signal and vibrations received from within the medium into an electrical signal.

William L. Rollwitz
Harvey S. Benson
INVENTOR

BY Donald Gunn 3,585,577

ULTRASONIC TRANSCEIVER

This application is a continuation of Ser. No. 672,091, filed Oct. 2, 1967, now abandoned and is related to application Ser. No. 672,092, filed Oct. 2, 1967 which was issued as Pat. No. 3,431,551.

SUMMARY OF PROBLEM AND INVENTION

Ultrasonic apparatus is traditionally used for obtaining graphic representations of the interiors of opaque objects in fields such as materials inspection, physiological analysis and the like. Devices in the prior art include extensive and complex equipment with traditionally separate transmitters and receivers with typically complex multiplexing or transducer switching apparatus. With a view of obtaining velocity information, it will be appreciated that coupling transmitter and receiver to a transducer or other radiating element yields a rather complex system for obtain doppler shift information.

Doppler shift information is particularly useful in evaluating flow velocities, internal vibrations, and other information associated with relative movements which give rise to doppler shift in the reflected wave front. Therefore, this invention is summarized as providing a new and improved ultrasonic transceiver, and more particularly, an ultrasonic transceiver providing doppler shift information wherein simultaneous transmission and reception of reflected waves provides an output signal from a simplified device.

An object of the present invention is to provide a new and improved continuous wave or pulsed transmitting and receiving means for ultrasonic uses which avoids the requirements of timing circuits and the like.

Another object of the present invention is to provide a new and improved transceiver which emits and receives ultrasonic radiation from a transducer without multiplexing or switching of the transmitter and receiver between radiating elements.

Yet another object of the present invention is to provide a new and improved continuous wave ultrasonic transceiver wherein the transmitting frequency remains stable while signals returned from the medium indicative of doppler shift are amplified and mixed with the transmitted frequency.

Still another object of the present invention is to provide a new and improved continuous wave device wherein the doppler shift information is modulated in the tank of the transmitting device without effecting transmission.

One object of the present invention is to provide a new and improved transceiver apparatus having only one active element, and that element cooperates with the oscillator, doppler shift demodulator and amplifier.

Another object of the present invention is to provide a new and improved transceiver oscillator operating sufficiently near Class "A" characteristics to amplify and yet which is sufficiently nonlinear to modulate the oscillator signal with the doppler shift signal information.

Figure 2:
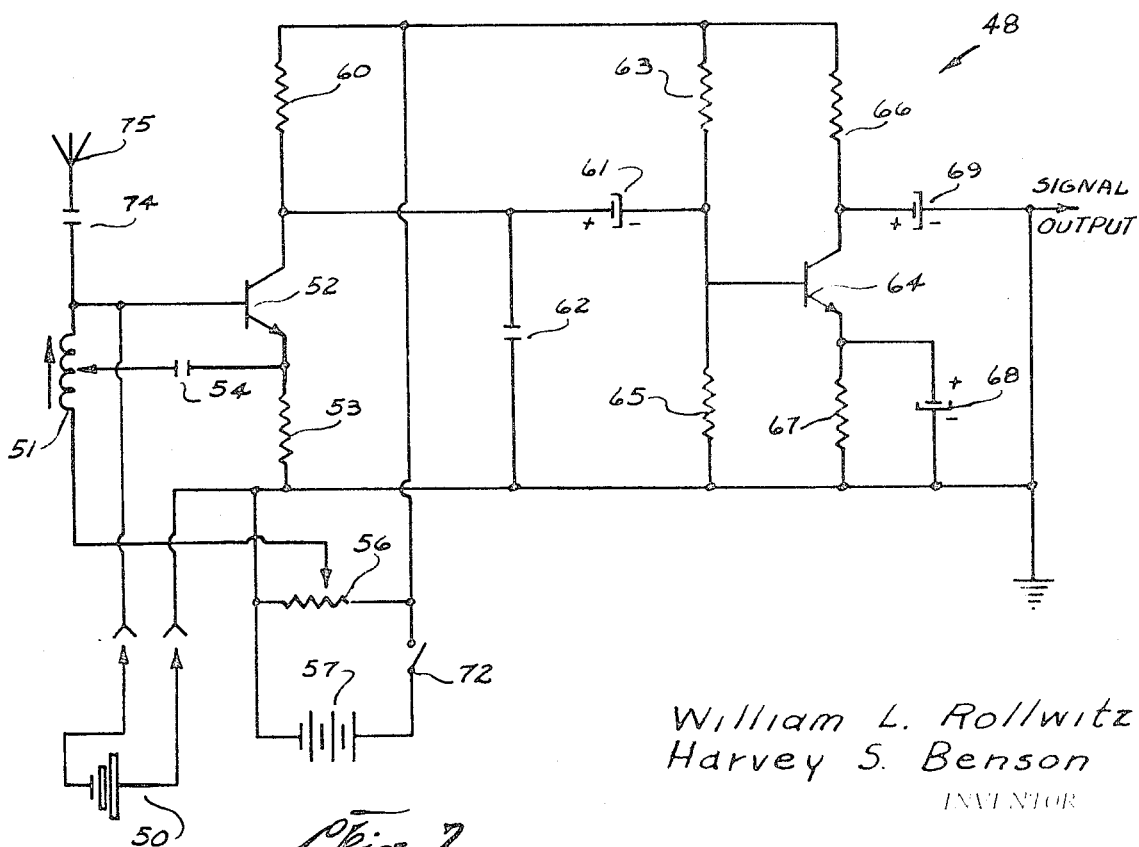

Other objects and advantages of the present invention will become more readily apparent from a consideration of the included specification and drawings wherein:

FIG. 1 is a schematic wiring diagram of the preferred embodiment of the present invention; and, FIG. 2 is a schematic wiring diagram of an alternative embodiment providing additional internal amplification.

Attention is first directed to FIG. 1 of the drawings which indicates the transceiver of the present invention with the numeral 10. The transceiver 10 incorporates a transducer means 12 for radiating and coupling ultrasonic wave fronts into a medium. For present purposes, a medium is an opaque material having relatively moving internal components. By way of example, reference is made to pipes having fluid flow therein wherein the flowing fluid causes a shift in frequency of reflected wave fronts returned to the transducer 12. Also, reference is made to physiological systems wherein relative movement is related to the vital signs of patients during examination. Those skilled in the ultrasonic arts are familiar with various coupling techniques used with the transducer means 12. For instance, the means 12 may typically be a piezoelectric crystal which is placed flat against the surface of the medium and coupled thereto by wetting the surface to mechanically couple vibrations from the means 12 into the medium. Because of generic nature of the medium, it has been omitted from the drawings and symbolic representation of the transducer means 12 is sufficient for purposes of the present invention.

Since several circuit functions are achieved in the preferred embodiment 10 of the present invention, attention is first directed to the individual circuit elements which will be noted and the circuit functions of the apparatus will be described in greater detail hereinafter. Attention is first directed to a tunable, tapped inductor 14. The transducer means 12 incorporates sufficient tuning capacitance which is connected across the inductor 14 through the parallel combination of the resistor 15 and capacitor 16. The inductor 14 is tapped at a point selected for proper operation (midpoint in many cases), and the tapped signal is provided through a series capacitor 17 and adjustable resistor 18 to the emitter of a bipolar or monopolar (FET)-type transistor 20. The transistor emitter (or drain in the monopolar transistor) is communicated with ground by means of a series resistor 21. The tank circuit including the inductor 14 is maintained at a selected bias voltage by means of a series resistor 23 communicated with the DC power source. The collector (or source in the monopolar transistor) circuit of the transistor 20 incorporates a series load resistor 24, which is bypassed by a capacitor 25. The output of the circuit means 10 is obtained from the collector by means of a series coupling capacitor 26.

Attention is next directed to the fact that the circuit shown in FIG. 1 incorporates a tank circuit including the inductor 14 and the capacitance of the transducer means 12. The upper end of the tank is connected to the base (or gate of the monopolar transistor) of the transistor 20, and the tap on the inductor 14 communicates through the level setting resistor 18 to the emitter of the transistor 20. The adjustable signal from the resistor 18 provided to the active circuit element 20 controls the level of oscillations in the tank circuit. While the tank cooperates with the active element means 20 to serve as signal generating means for the present invention, it will be noted that a further function is accomplished by the tank circuit. Reference is made to the fact that the transducer means 12 is not only a circuit element comprising a portion of the oscillator, but also, the transducer means 12 is also a signal source for injecting doppler shift signals into the tank.

Consider response of the transducer means 12 to doppler shift signals. The signal wave front is radiated from the transducer means 12 into the medium and is returned as reflections from interfaces found in the medium. With no relative velocity, the signal returned is the frequency transmitted and differs only by providing a phase shift in the signal. This phase shift between the transmitted and received waves will cause a shift in the level of oscillation and therefore a change in the DC current in the transistor 20. In this invention, this DC phase shift is not used in the output shown. However, relative movement within the medium provides the doppler shift (a shift in frequency) signal in the oscillator means presently described.

On return of the wave front at a different frequency, the beat frequency in the tank circuit modulates the tank circuit signal applied to the base of the transistor 20. In this regard, it will be noted that the modulation is amplitude modulation whereby the oscillator signal envelope carries the doppler shift information. Thus it will be noted that mixer circuit means cooperates with the transistor to amplify the modulated envelope for output through coupling capacitor 26.

In the transceiver 10, the signal generating means operates continuously and indefinitely. And, the transceiver 10 functions without multiplexing apparatus, multiple antennas or timing circuits. That is to say, the transducer 12 is simultaneously both radiating and receiving ultrasonic signals for the medium. In the mixing of transmitted and received signals, it will be noted that the oscillator is marginally operated by feedback control through the variable resistance 18, whereby oscillations are only weakly maintained. The marginally stable condition of the oscillator at the marginal operational point makes the device more sensitive to receive signals providing a relatively good receiver while yet maintaining transmitter stability. More specifically, operation at a marginal point of the oscillator means increases the sensitivity of the device by providing a large beat signal with an incremental signal at the transducer means 12.

The transceiver 10 is provided with a frequency responsive load across which the output signal is developed. Reference is made to the tendency of the capacitor 25 to shunt high frequency signals to ground. This aids the device in materially reducing the transmitter frequency while the doppler shift signal is substantially amplified.

It should be noted that the transducer means 12 has a self-resonant frequency; preferably, to give broad frequency coverage, the tank of the transceiver 10 is operated at a frequency other than the self-resonant frequency of the transducer means 12. When the transducer is operated at its self-resonant frequency, additional sensitivity is gained.

Attention is next directed to FIG. 2 of the drawings which illustrates a slightly more elaborate transceiver means 48. The circuitry shown in FIG. 2 varies, in the main, by including additional amplifier means as will be noted. Considering first the details of the device, the transducer means 50 forms a tank circuit cooperating with the inductor 51. The upper end of the inductor 51 is communicated with the base of a transistor 52 (again, it may be a bipolar or monopolar transistor) having its emitter resistor 53 grounded. The inductor 51 is tapped by means of a coupling capacitor 54 communicating with the emitter of the transistor 52 to complete the feedback path needed to maintain oscillations. The lower end of the inductor 51 is not directly grounded but is connected to a bias resistor 56 and grounded through a capacitor 73. The voltage level in the variable resistor 56 is obtained from a potential source 57.

The transistor 52 includes a collector load impedance 60 across which the amplified signal is developed. The output is taken from the collector by means of a series capacitor 61, and high frequency signals are shunted to ground by means of a capacitor 62. Coupling capacitor 61 communicates with a voltage divider including resistors 63 and 65 which provide the base voltage for a transistor 64 (also, a bipolar or monopolar transistor will serve well). The transistor 64 includes a collector load resistor 66 and an emitter bias supply including parallel elements 67 and 68. The output signal is provided through a coupling capacitor 69 at amplified levels.

The improved transceiver means 48 shown in FIG. 2 further includes an off-on switch 72 which regulates the voltage level for variable resistor 56 and the power source for the transistors.

FIG. 2 also includes a series coupling capacitor 74 communicating with an antenna 75. The antenna is represented generically since those skilled in the art are familiar with details of construction and operation for transmitting an AM signal. The antenna radiates the modulated radio frequency signal across the tank circuit and in this manner the doppler shift signal is telemetered to a remote location.

Considering operation of the circuit shown in FIG. 2, it should be first noted that the tank circuit is slightly different from the one shown in FIG. 1. This is not critical since a large variety of tank circuits are known in the art and the variation is only indicative of circuits available. The tank circuit serves as the signal generating means in cooperation with the active circuit element 52 whereby the signal to be transmitted is provided to the transducer means 50. The continuous wave radiation from the transducer means 50 enters the medium in a known manner and is reflected therein to return to the transducer means 50. Again, absent relative movement in the medium, the frequency transmitted is also the frequency returned, and therefore, no additional signal is induced in the tank for mixing with the oscillator frequency. However, on occurrence of relative movement, the doppler shift component is noted in the transducer means 50. The returned signal is beat against the signal from the signal generating means and the beat signal amplitude modulates the transmittal frequency for amplification by the transistor means 52. The amplified and modulated signal noted at the collector of the transistor 52 is developed across the transistor load impedance 60 for coupling to the next stage. However, it should be noted that high frequency components are filtered to ground by the capacitor means 62. The envelope is detected in the modulated signal and communicated to the amplifier stage including transistor means 64. The coupling capacitor 61 is a rather large capacitance since low, audio frequencies are likely to be passed to the transistor 64.

The amplifier means 64 functions in a conventional manner wherein the bias voltage between the base and emitter is determined by the voltage divider including resistors 63 and 65 and the emitter circuit including elements 67 and 68. The output signal is developed across collector load resistor 66 and the coupling capacitor 69 communicates it with the output terminal.

Considering FIG. 2, it should be noted that it is similar to FIG. 1 in providing a continuous wave ultrasonic transceiver cooperating with the transducer means to transmit sound vibrations therefrom and to output doppler shift signals in an easily handled form. Moreover, the circuitry shown in FIG. 2 is adapted for telemetry to remote locations by use of the antenna means 75.

The circuit means 48 shown in FIG. 2 provides an amplified signal level adequate for recording, analysis, conversion in an appropriate device, and the like.

Briefly, the foregoing described preferred embodiments of a new and improved transceiver means; and a scope of the present invention is defined by the appended claims.

We claim:

1. An ultrasonic transceiver comprising:
  a. a transistor having base, collector, and emitter terminals;
  b. a tank circuit connected to at least two of the terminals of said transistor for forming an oscillator circuit capable of sustaining oscillations;
  c. transducer means connected in said tank circuit, said transducer having an impedance which at least partially comprises a portion of said tank circuit, and being further communicated with an ultrasonic medium for transmitting and receiving ultrasonic vibrations;
  d. said transducer means being connected to apply the signal thereacross at least directly to said transistor for amplification; and,
  e. an output circuit connected to at least one terminal of said transistor and provided with the amplified transducer means signal for forming an output of doppler frequency shifts representative of relative movement in the medium.

2. The invention of claim 1 wherein said transistor is connected at its collector to a load resistor across which the amplified signal is developed, and wherein said output circuit includes a coupling capacitor connected to said load resistor.

3. The invention of claim 1 wherein a coupling capacitor is connected to said transistor for deriving the the amplified signal therefrom, said output circuit including:
  a. a second transistor having base, collector and emitter terminals;
  b. said coupling capacitor connected to one of the terminals of said second transistor; and,
  c. additional circuit elements connected to said second transistor for forming an amplified signal.

4. The invention of claim 3 wherein said additional circuit elements include an output coupling capacitor connected to said second transistor.

5. The invention of claim 1 wherein said transducer means includes a capacitive impedance and said tank circuit includes an inductive reactance which forms a resonant circuit with said transducer means.